UNITED STATES PATENT OFFICE.

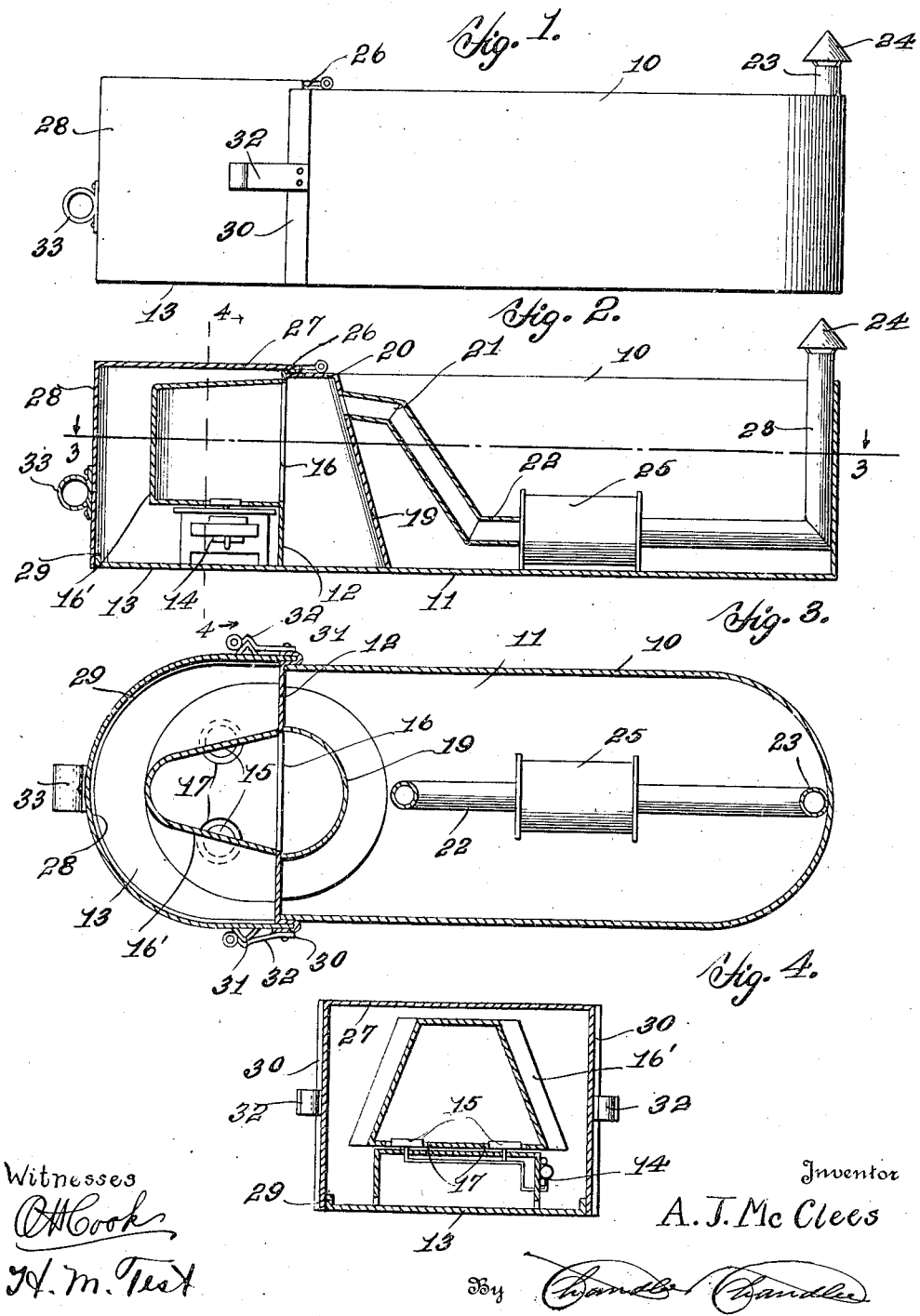

ALBERT J. McCLEES, OF LUDLOW, ILLINOIS.

TANK-HEATER.

1,289,842.

Specification of Letters Patent.  Patented Dec. 31, 1918.

Application filed October 16, 1917. Serial No. 196,927.

*To all whom it may concern:*

Be it known that I, ALBERT J. MCCLEES, a citizen of the United States, residing at Ludlow, in the county of Champaign, State of Illinois, have invented certain new and useful Improvements in Tank-Heaters; and I do hereby declare the following to be a full, clear, and exact description of the invention, such as will enable others skilled in the art to which it appertains to make and use the same.

This invention relates to new and useful improvements in heating devices and particularly to devices for heating the water in stock watering tanks.

One object of the present invention is to provide a novel and improved device of this character wherein the water will be more evenly heated and access to the parts of the heating device more readily had.

Another object is to provide a device of this character wherein the heating device is so constructed and arranged that the maximum of heat will be delivered thereto and at the lowest or coolest part of water in the tank.

Other objects and advantages will be apparent from the following description when taken in connection with the accompanying drawing.

In the drawing:

Figure 1 is a side elevation of a stock watering tank having my invention applied thereto.

Fig. 2 is a vertical longitudinal central sectional view through the tank and heating device thereof.

Fig. 3 is a horizontal longitudinal sectional view taken on the line 3—3 of Fig. 2.

Fig. 4 is a vertical transverse sectional view taken on the line 4—4 of Fig. 2.

Referring particularly to the accompanying drawing, 10 represents a stock watering tank the bottom 11 of which extends beyond the end wall 12, to provide a platform 13 on which is disposed the oil heating stove 14. This stove includes the burners 15. In the end wall 12 there is formed an opening 16, and secured to the outer face of the wall, in such position that it covers the opening, is a hollow casing 16'. The bottom wall of the said casing is preferably flat and formed with the vertical openings 17 for the entrance of the before-mentioned burners 15. Secured to the inner face of the wall 12 is a second hollow casing 19, the lower portion of which is secured to the bottom 11 of the tank, while the upper end is closed by a wall 20. This second casing is preferably an upwardly tapering structure, and connected to the upper portion of the said casing 19 is a forwardly and downwardly extending heat conducting pipe 21, the same being connected to the adjacent end of a pipe 22 which extends throughout the length of the tank, and disposed close to the bottom thereof. To the other end of this pipe 22 there is connected the vertical stack 23, the upper end being provided with a hood 24. Connected in the intermediate portion of the pipe 22 is a drum 25 into which the heat is collected as it passes toward the stack, whereby a radiating surface of considerable area is provided to heat the surrounding water in the tank.

The upper end of the wall 12 of the tank is turned horizontally, as shown at 26, and said portion is formed with tubular members which coöperate with similar tubular members of the top wall 27 of the cover hood of the heating stove 28, to form a hinge a rod or pin being disposed through said tubular members whereby said hood can be easily raised and lowered. This hood is disposed to have its lower edge engage outwardly of the bottom and the upturned edges 29 thereof. Secured to the side walls of the tank, adjacent the ends of the wall 12, are the flanges 30, the same being spaced from said side walls to permit the vertical edges of the curved wall of the hood to engage between them and the side walls. Thus the heating stove is completely inclosed and the escape of heat, except through the casings 16' and 19, and the heat conducting pipes 21 and 22.

It will thus be seen that the heat from the burners of the stove will pass upwardly through the openings of the casing 16', through the opening in the end walls 12, through the casing 19, and the pipes 21 and 22 and the drum 25, the products of combustion escaping out through the stack, as will be readily understood.

On the end portions of the curved wall of the hood 28 are secured the projections 31 which are arranged to be engaged by the spring latches 32 carried by the side walls of the tank. Thus the hood 28 can be effectively held in closed position. A handle 33 is carried by the intermediate portion of the hood by means of which the same can be raised and lowered, as will be understood.

Particular attention is called to the arrangement of the casings 16' and 19, which, together, form a hot air drum for accumulating heated air and delivering same to the heat conducting pipes at the bottom of the tank, where the water is the coolest. The drum in the pipe 22 is a further means of accumulating the heated air where it is radiated to the best advantage.

What is claimed is:

1. The combination with a stock watering tank having an opening in one of the end walls thereof, of a pair of casings disposed on each side of said wall and covering the opening, one of said casings being disposed within the tank and the other one outside of the tank, the latter casing having its lower wall elevated from the bottom of the tank and formed with heat receiving openings, a heating means disposed beneath said openings, and a heat conducting pipe connected to the inner casing and extending along the bottom of the tank within the water therein.

2. The combination with a stock watering tank, of a platform formed on one end of the tank and externally thereof, a heating device mounted on the platform, a heat receiving casing mounted on the tank and having openings for receiving heat from the heating device, a hood movably mounted on the tank and arranged to inclose the heating device and the heat receiving casing, and a heat conducting means connected to the hood and extending through the tank and formed intermediate its length with a heat retarding and radiating drum.

In testimony whereof, I affix my signature in the presence of two witnesses.

ALBERT J. McCLEES.

Witnesses:
SARAH HAWLEY,
W. M. LATEER.

Copies of this patent may be obtained for five cents each, by addressing the "Commissioner of Patents, Washington, D. C."